United States Patent
Tsuchihashi et al.

(10) Patent No.: US 7,504,989 B2
(45) Date of Patent: Mar. 17, 2009

(54) ON-VEHICLE RADAR DEVICE

(75) Inventors: Masataka Tsuchihashi, Kobe (JP); Nobukazu Shima, Kobe (JP); Kazuo Shirakawa, Kawasaki (JP)

(73) Assignees: Fujitsu Ten Limited, Kobe-shi (JP); Fujitsu Limited, Kawasaki-shi (JP)

( * ) Notice: Subject to any disclaimer, the term of this patent is extended or adjusted under 35 U.S.C. 154(b) by 42 days.

(21) Appl. No.: 11/882,723

(22) Filed: Aug. 3, 2007

(65) Prior Publication Data

US 2008/0169966 A1      Jul. 17, 2008

(30) Foreign Application Priority Data

Aug. 9, 2006   (JP) ............... 2006-216327

(51) Int. Cl.
*G01S 13/93* (2006.01)
*G01S 7/35* (2006.01)
*G01S 13/00* (2006.01)

(52) U.S. Cl. ............... 342/91; 342/27; 342/28; 342/70; 342/89; 342/118; 342/128; 342/175; 342/195; 342/196

(58) Field of Classification Search ......... 180/167–169; 701/300, 301; 342/27, 28, 70–72, 175, 192–197, 342/89–103, 52–56, 104–115, 159, 165, 342/173, 174, 118, 128–133
See application file for complete search history.

(56) References Cited

U.S. PATENT DOCUMENTS

| 3,513,471 | A | * | 5/1970 | Mooney, Jr. et al. ........... 342/91 |
| 3,579,239 | A | * | 5/1971 | Purcell et al. ................. 342/91 |
| 4,019,182 | A | * | 4/1977 | DeLorenzo et al. ........... 342/93 |
| 4,553,144 | A | * | 11/1985 | Houdard et al. .............. 342/89 |
| 4,991,146 | A | * | 2/1991 | Ransdell et al. .............. 367/98 |
| 5,572,215 | A | * | 11/1996 | Evans et al. .................. 342/195 |
| 5,633,642 | A | | 5/1997 | Höss et al. |
| 6,124,823 | A | * | 9/2000 | Tokoro ......................... 342/70 |
| 6,844,843 | B2 | * | 1/2005 | Ishii et al. ..................... 342/91 |
| 6,856,272 | B2 | * | 2/2005 | Levitan et al. ................ 342/91 |
| 7,339,517 | B2 | * | 3/2008 | Nakanishi ..................... 342/70 |
| 2004/0183712 | A1 | * | 9/2004 | Levitan et al. ................ 342/91 |

FOREIGN PATENT DOCUMENTS

| JP | A 64-65475 | 3/1989 |
| JP | A 9-506698 | 6/1997 |
| JP | A 2003-267084 | 9/2003 |
| JP | A 2005-9913 | 1/2005 |

* cited by examiner

Primary Examiner—Bernarr E Gregory
(74) Attorney, Agent, or Firm—Oliff & Berridge, PLC

(57) ABSTRACT

An on-vehicle radar device has a transmission section for transmitting a radio wave to an object, a receive section for receiving the radio wave reflected by the object, and a processing section for dividing an object detection range into three or more of a plurality of areas, setting a threshold of an intensity of the radio wave received for each of the plurality of areas, and judging the existence of an object by comparing the intensity of the radio wave and the threshold. This processing section sets, based on an auto-cruise control mode or pre-crash mode of the vehicle, a threshold of a part of an area in the object detection range to be lower than the threshold of the other areas, or changes the threshold of the detection area according to the object detection status.

4 Claims, 12 Drawing Sheets

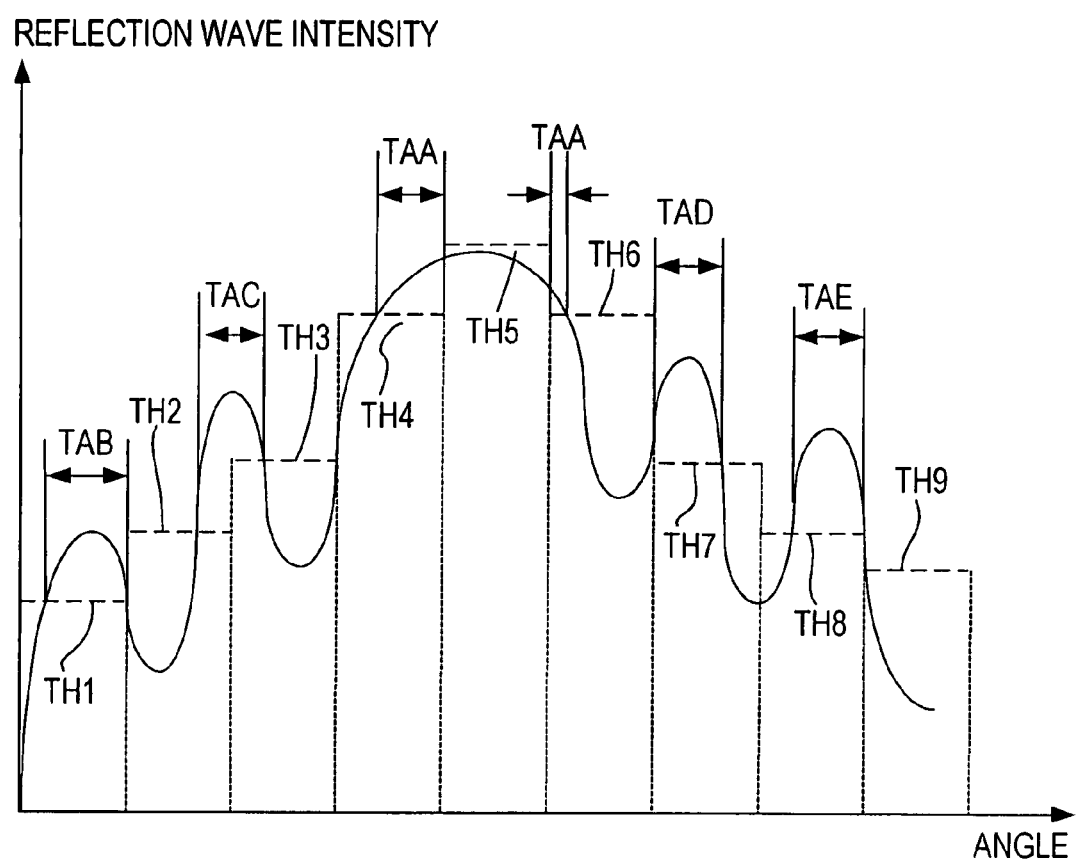

ON-VEHICLE RADAR DEVICE

CROSS-REFERENCE TO RELATED APPLICATIONS

This application is based upon and claims the benefit of priority from the prior Japanese Patent Application No. 2006-216327, filed on Aug. 9, 2006, the entire contents of which are incorporated herein by reference.

BACKGROUND OF THE INVENTION

1. Field of the Invention

The present invention relates to an on-vehicle radar device for detecting an object in front by radio waves, and more particularly to an on-vehicle radar device which sets a threshold of reflection wave intensity from an object for each area, and detects an object based on the threshold being set.

2. Description of the Related Art

On-vehicle radar devices installed on the front of a vehicle to measure a distance to an object from the front of the vehicle and a relative velocity of the vehicle and the object have been proposed. By measuring the distance up to the object and the relative velocity, an alarm device for warning of an impending collision with an object in advance can be activated, or a brake can be activated to prevent collision with an object.

As a conventional on-vehicle radar device, for example, phase mono-pulse type on-vehicle radar device is proposed. The phase mono-pulse type on-vehicle radar device transmits a radio wave beam in a millimeter wave area, receives the wave reflected by an object using a plurality of receive antennas, and determines a direction of the object based on the phase difference of the receive waves.

FIG. 1 shows an example of receiving a reflection wave in the conventional phase mono-pulse type on-vehicle radar device. In FIG. 1, θ is an angle to indicate the direction of an object when the front direction of the vehicle is 0°. The distance D is a space between two receive antennas, and the phase difference φ is a phase difference of the two receive waves. The two receive antennas 14a and 14b receive the waves reflected by the object existing in an angle θ direction. The angle θ which indicates the direction of the object, which reflects the waves to be received by the two receive antennas 14a and 14b, is determined by the following Expression.

$$\theta = \sin^{-1}(\lambda\phi/2\pi D) \quad \text{[Expression 1]}$$

Here λ is a wavelength.

In such an on-vehicle radar device, a predetermined value is set for the threshold of the reflection wave intensity for detecting an object for all the directions. If a reflection wave having an intensity exceeding this threshold is detected in a specific direction, it is judged that an object exists in this direction.

On the other hand, Japanese Patent Application Laid-Open No. 2005-009913, for example, discloses a technology to make detection of an object easier by providing separate thresholds to the center area of the detection range of the reflection wave and the edge area of the detection range according to the intensity distribution of the transmission wave.

According to this technology, the threshold of the reflection wave detection is increased at around 0° which is the center area of the object detection range, so as to block noise and make detection of the object easier. Whereas near the edge of the detection range, the threshold of the reflection wave detection is decreased so as to receive the reflection wave easily. This kind of setting the threshold corresponds to the characteristic of the antenna where the intensity of the transmission wave becomes maximum amounts at the center, and decreases moving toward the edge.

Similar technologies are also disclosed in Japanese Patent Application Laid-Open No. 2003-267084, Japanese Patent Application Laid-Open No. Hei 9-506698 (corresponding U.S. Pat. No. 5,633,642) and Japanese Patent Publication Laid-Open No. Sho 64-65475, for example.

With such detection methods, however, the vehicle in front existing at the center area of the detection range is hard to be detected. Particularly in an active cruise control system (ACC) that detects a vehicle in front which is traveling on a same lane by radar and adjusting the velocity automatically according to the velocity of this vehicle in front, the vehicle in front that is supposed to be followed up may be missed in detection.

That is, if a threshold is set according to the intensity of the transmission wave as the case of the prior art, the threshold of the intensity of the receive wave is low at the edge area of the detection range, and the threshold of the intensity of the receive wave at the center is high. Since this means to increase the threshold in the center area, where the probability of detecting a vehicle in front is high, it causes a detection omission of a vehicle in front, and makes follow up of the vehicle in front difficult in an active cruise control system where detection of a vehicle in front to be followed up is critical.

Also in such a traveling situation as a curve, a vehicle traveling in front on the same lane may be miss-detected as a vehicle traveling in front on a different lane, and a detection error may occur.

A radar device which is mounted on a vehicle is used not only for an active cruise control system (ACC), but also for pre-crash safe systems (PCS) for detecting an obstacle, such as a guard rail, on-coming vehicles, and a vehicle traveling next to it in a same direction, in advance, and avoiding it.

Which ACC or PCS are more critical changes depending on the traveling situation of the vehicle, and the information that should be supplied depends on the system. However a method of setting thresholds for supplying information according to the change of the situation of the vehicle has not been proposed.

SUMMARY OF THE INVENTION

With the foregoing in view, it is an object of the present invention to provide an on-vehicle radar device which can easily detect an object existing at the center area of the detection range, and prevents omission of the detection of a vehicle in front which is supposed to be followed up.

It is another object of the present invention to provide an on-vehicle radar device for preventing a detection error due to miss-detecting a vehicle traveling in front on the same lane with a vehicle traveling in front on a different lane depending on the travel conditions.

It is still another object of the present invention to provide an on-vehicle radar device for detecting a vehicle traveling in front on a same lane, distinguishing it from an obstacle.

To solve the above problems, a first aspect of an on-vehicle radar device of the present invention has a transmission section for transmitting a radio wave to an object, a receive section for receiving the radio wave reflected by the object, and a processing section for dividing an angle range, where an object is detected by receiving the radio wave, into three or more of a plurality of areas, setting a threshold of an intensity of the radio wave received for each of the plurality of areas, and judging the existence of an object by comparing the intensity of the radio wave which is received and the threshold for each of the plurality of areas. And when the traveling velocity supplied from a velocity detection device for detecting the velocity of the vehicle is a predetermined velocity or more in a status where the vehicle is automatically adjusting the velocity according to the traveling velocity of a vehicle in front, the processing section sets a threshold of a second angle area in a detection range to be lower than a threshold of a first angle area and a third angle area.

A second aspect of an on-vehicle device of the present invention has a transmission section for transmitting a radio wave to an object, a receive section for receiving the radio wave reflected by the object, and a processing section for dividing an angle range where an object is detected by receiving the radio wave into three or more of a plurality of areas, setting a threshold of an intensity of the radio wave received for each of the plurality of areas, and judging the existence of an object by comparing the intensity of the radio wave which is received and the threshold for each of the plurality of areas. And the processing section sets a threshold of one area out of a first angle area and a third angle area in the detection area of the object to be higher than a threshold of another area out of the first angle area and the third angle area according to information on road shape supplied from a road shape recognition device for recognizing a shape of a road on which the vehicle is traveling in a status where the vehicle detects an object in advance and avoids the same.

A third aspect of an on-vehicle radar device of the present invention has a transmission section for transmitting a radio wave to an object, a receive section for receiving the radio wave reflected by the object, and a processing section for dividing an angle range where an object is detected by receiving the radio wave into three or more of a plurality of areas, setting a threshold of an intensity of the radio wave received for each of the plurality of areas, and judging the existence of an object by comparing the intensity of the radio wave which is received and the threshold for each of the plurality of areas. And the processing section decreases a threshold of the area when an object existing in the area is moving in a status where the vehicle is automatically adjusting the velocity according to the traveling velocity of a vehicle in front.

The fourth aspect of an on-vehicle radar device of the present invention has a transmission section for transmitting a radio wave to an object, a receive section for receiving the radio wave reflected by the object, and a processing section for dividing an angle range where an object is detected by receiving the radio wave into three or more of a plurality of areas, setting a threshold of an intensity of the radio wave received for each of the plurality of areas, and judging the existence of an object by comparing the intensity of the radio wave which is received and the threshold for each of the plurality of areas. And the processing section decreases a threshold of the area where the object existing in the area is stationary in a status where the vehicle detects an obstacle in advance and avoids the same.

In a preferred embodiment, when the traveling velocity supplied from the velocity detection device is a predetermined velocity or more, the processing section sets the threshold for the area at the center in the detection range of the object by receiving the radio wave to be low, and sets the threshold for the area at the edge of the detection range to be high, and recognizes the object.

In another preferred embodiment, the processing section sets the threshold for each detection area corresponding to road shape information, according to the road shape information supplied from one or a plurality of road shape recognition devices for recognizing the shape of a road on which a vehicle mounting the on-vehicle radar device is traveling.

In another preferred embodiment, the road shape recognition device is a camera device which captures an image an area in front of the vehicle mounting the on-vehicle radar device, and recognizes the road shape.

In another preferred embodiment, the road shape recognition device is a car navigation device which recognizes a position of the vehicle mounting the on-vehicle radar device during traveling, and displays the position on a map.

In another preferred embodiment, the road shape recognition device is a yaw rate sensor which detects the change of the direction of the vehicle mounting the on-vehicle radar device.

In another preferred embodiment, one of the road shape recognition devices is a steering rudder angle sensor which detects an angle of a steering wheel of the vehicle mounting the on-vehicle radar device.

In another preferred embodiment, one of the road shape recognition devices is a mobile phone connected to an vehicle control device via USB (Universal Serial Bus) or a wireless device such as a ground digital terminal device.

In another preferred embodiment, the processing section sets the threshold corresponding to the information on whether the road is a highway or a general road for each area according to information on whether the road is a highway or general road that is supplied from a road type recognition device for recognizing the type of road on which the vehicle mounting the on-vehicle radar device is traveling.

In another preferred embodiment, the traveling condition is determined as to whether the road on which the vehicle is traveling is being driven on the left or right, and according to the setting of a road traveling distinction setting section for setting whether the road on which the vehicle mounting the on-vehicle radar device is traveling is being driven on the left or right as the traveling condition, the processing section sets the threshold corresponding to the above setting for each area.

In another preferred embodiment, one of the road shape recognition devices, the road type setting section and a traveling status recognition device is a on-vehicle device which receives a service from an infra type road status providing unit such as DSRC (Dedicated Short Range Communication) and DSSS (Drivers Safety Support System). In detail, information is received from the DSRC on joining points in an express road and a threshold on a side of the jointing lane. Or, weather information so as to stirring a risk of delayed recognition of the driver and of road environment such as rain or fog is received from the ground digital broadcast, the threshold is determined according to such received information. Memory of the vehicle control device may store an appropriate combination of the information.

In another preferred embodiment, when the relative velocity of the object which reflected the above mentioned received radio wave indicates a direction where the vehicle and the object become close to each other, and is higher than a predetermined velocity, the processing section sets the threshold for the area where the radio wave exceeding the threshold is received to be low.

In another preferred embodiment, when the velocity of the vehicle in front is lower than a predetermined velocity in a status where the vehicle is automatically adjusting the velocity according to the traveling velocity of a vehicle in front, the processing section changes the threshold to be low.

In another preferred embodiment, when the relative velocity of the object which reflected the above mentioned received radio wave is lower than a predetermined velocity, the processing section sets the threshold for the area where the radio wave exceeding the threshold is received to be low.

In another preferred embodiment, when the object which is reflected the radio wave is exist in one area, and the relative velocity of the object is lower than a predetermined velocity, if receiving the radio wave exceeding the threshold from another area different from one area, the processing section sets the threshold for the another area to be lower than the threshold for the one area.

In the on-vehicle radar device of the present invention, the detection range of the relative angle of the object is divided into three or more areas, and a threshold is set for each area according to the traveling condition of the vehicle, such as a road information of curved road, general/express road distinction, traveling velocity of the vehicle and a change of status in road surface by weather, therefore a detection error of a vehicle traveling in front on a same lane and obstacle or a miss-detection omission of an obstacle can be prevented.

Also by setting a threshold in each area according to the relative velocity of a detected object, a vehicle traveling in front on a same lane can be detected and be differentiated from an obstacle.

By decreasing the threshold for an object that is rapidly approaching based on a detected relative velocity, an obstacle can be easily detected and a pre-crash system can be supported. Also by decreasing the threshold of an object of which relative velocity is low, a vehicle traveling in front at about the same velocity can be easily detected, and cruise control can be supported.

BRIEF DESCRIPTION OF THE DRAWINGS

FIG. 21 is a diagram depicting an example of changing the thresholds based on the velocity of an observed object in a pre-crash safe system according to the embodiment in FIG. 18.

DESCRIPTION OF THE PREFERRED EMBODIMENTS

Embodiments of the present invention will now be described in the sequence of first embodiment, second embodiment, third embodiment, fourth embodiment and fifth embodiment of the on-vehicle radar device. The technical scope of the present invention, however, is not limited to these embodiments, but shall cover matters stated in the Claims and equivalents thereof.

First Embodiment of On-vehicle Radar Device

Figure 1:
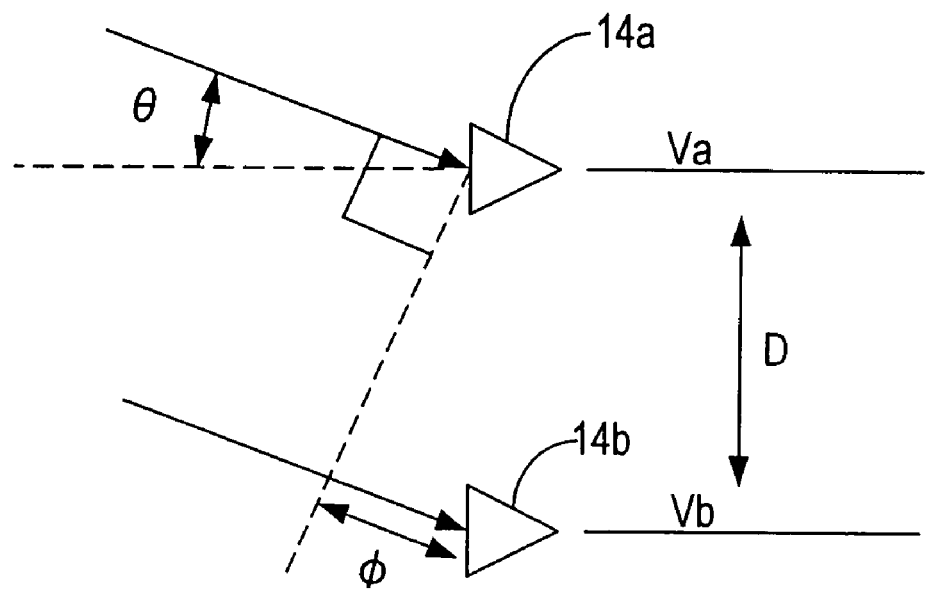
FIG. 1 is a diagram depicting an example of receiving a reflection wave in a conventional phase mono-pulse type on-vehicle radar device.
Figure 2:
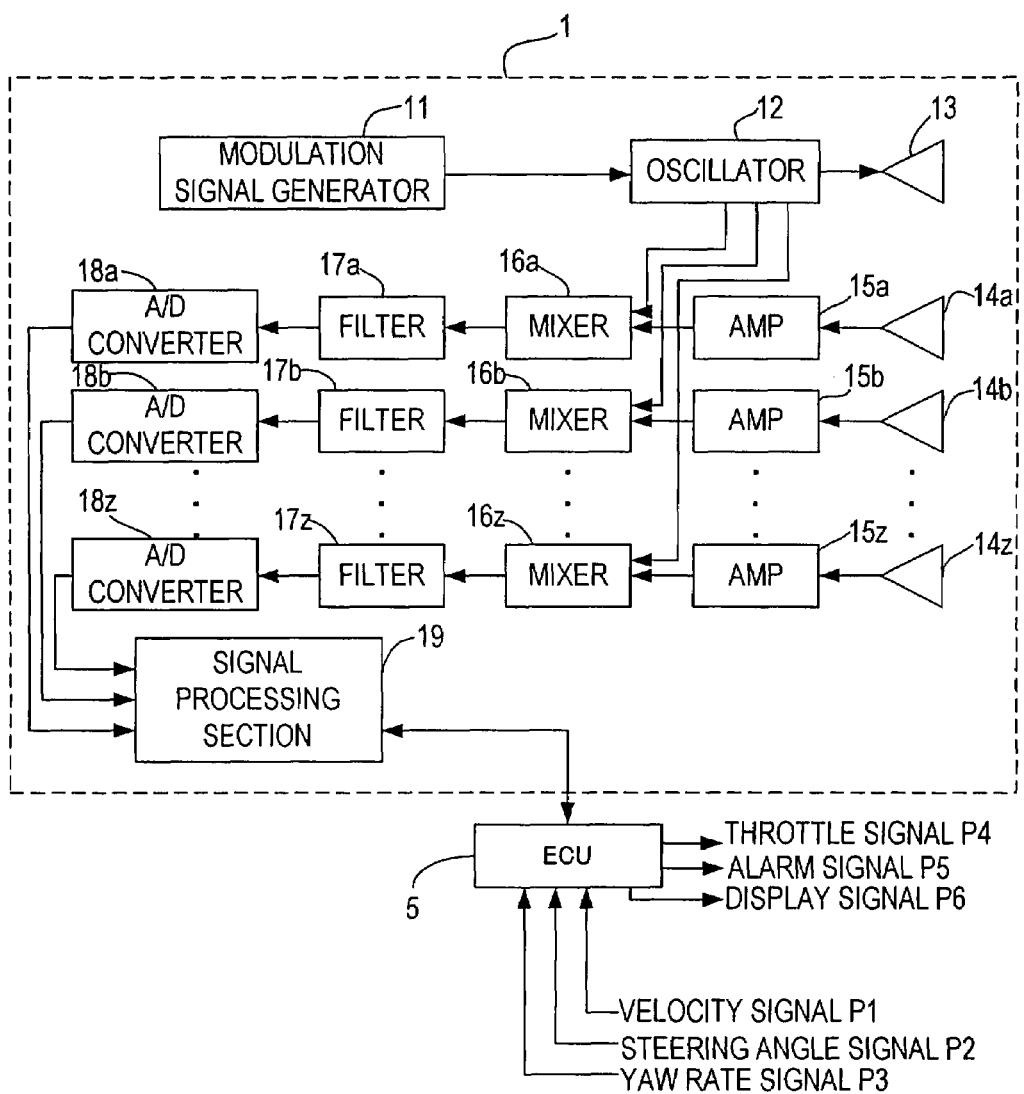
FIG. 2 is a block diagram depicting an on-vehicle radar device according to an embodiment of the present invention.
Figure 3:
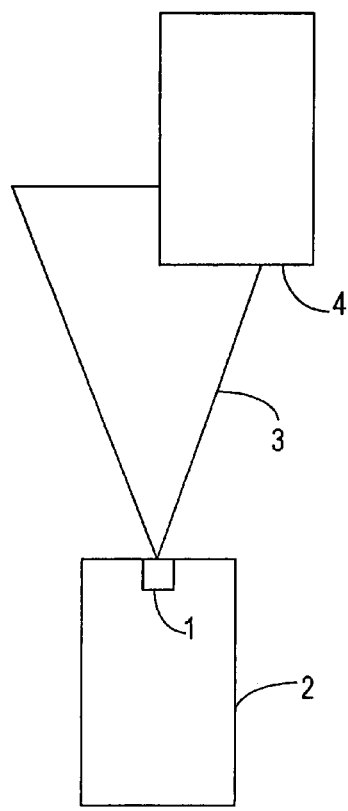
FIG. 3 is a diagram depicting an observation of a vehicle in front of the on-vehicle radar device in FIG. 2.
Figure 4:
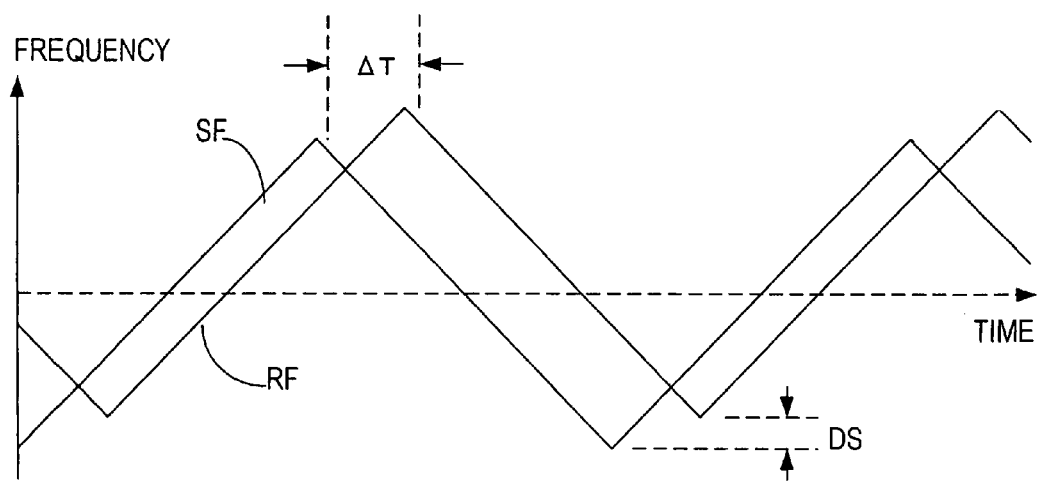
FIG. 4 is a diagram depicting the frequencies of the transmission wave and receive wave in FIG. 2.

FIG. 2 is a block diagram depicting an on-vehicle radar device according to the first embodiment of the present invention, FIG. 3 is a diagram depicting the observation of a vehicle in front of an on-vehicle radar device, and FIG. 4 is a diagram depicting the relationship of the transmission wave and the receive wave to be applied FMCW as signal system of the on-vehicle radar device.

As FIG. 3 shows, an on-vehicle radar device 1 is installed on the front part of a vehicle 2, and detects a vehicle 4 in front by transmitting a radio wave in a millimeter wave area throughout a detection range 3 and receiving a reflected wave form the vehicle in front. The on-vehicle radar device 1 also detects obstacles when the obstacle exists in this peripheral area.

As FIG. 2 shows, a transmission system of the on-vehicle radar deice 1 installed on the vehicle 2 is comprised of a modulation signal generation 11, an RF oscillator (VCO) 12, and a transmission antenna 13. The modulation signal generator 11 generates a modulation signal for frequency-modulating a millimeter carrier wave output from the RF oscillation 12, for example. The RF oscillator 12 of the on-vehicle radar device 1 generates a transmission signal modulated by this modulation signal, and transmits it to an area in front of the vehicle 2 via the transmission antenna 13.

In reference to FIG. 4, a method for determining the position and the relative velocity of an object based on the frequencies of a transmission wave and a receive wave when using FMCW as signal system will be described. In FIG. 4, the ordinate is the frequency, and the abscissa is the time. A transmission frequency SF of the transmission wave, which is sent based on the modulation signal generated by the modulation signal generator 11 in FIG. 2, increases at a constant rate during a predetermined time, then decreases at the same rate and returns to the original frequency.

The transmission frequency SF repeats this periodic frequency change. A time change of instant frequency RF of a receive signal acquired that an object reflects this transmission wave delays by the time difference $\Delta T$ compared with that of the transmission frequency SF.

The position from the object reflecting the transmission wave can be calculated based on this time difference $\Delta T$. The receive frequency RF receives the Doppler shift DS based on the relative velocity of an object reflecting the transmission wave. Based on this Doppler shift DS, the relative velocity of the object and the vehicle 2 is determined.

As FIG. 2 shows, the transmitted transmission wave is reflected by an object that exists in front, and is received by a plurality of receive antennas 14a, 14b, . . . 14z. The receive system of the on-vehicle radar device 1 is comprised of receive antennas 14a to 14z, amplifiers (AMP) 15a to 15z, mixers 16a to 16z, filters 17a to 17z, analog digital converters (hereafter called A/D converters) 18a to 18z, and a signal processing section 19.

In this example, the number of amplifiers 15a to 15z, mixers 16a to 16z, filters 17a to 17z and A/D converters 18a to 18z to be installed are the same as the number of receive antennas 14a to 14z.

A receive processing based on this configuration will now be described. A reflection wave reflected by an object is received by the plurality of receive antennas 14a to 14z. The plurality of receive antennas 14a to 14z receive the reflection wave from each object, and the direction of the object which reflected the reflection waves is judged based on the phase difference of the received reflection waves.

In other words, the receive signals from the receive antennas 14a to 14z are amplified by the amplifiers 15a to 15z respectively. The amplified signals are mixed with the transmission signals, which are generated by the oscillator 12, by the mixers 16a to 16z respectively. The mixers 16a to 16z generate and output beat signals where the receive signals and the transmission signals are mixed.

Using a beat signal in a period when both the receive signal and the transmission signal rise and a beat signal in a period when both the receive signal and the transmission signal drop, the distance and the relative velocity are calculated. In other words, the beat signals are input to the filters 17a to 17z respectively. The signals of which band is limited by the filters 17a to 17z are input to the A/D converters 18a to 18z, and are converted into digital signals respectively. Each digital signal is input to a signal processing section 19 and processed to obtain necessary information.

As described in FIG. 5 and later, the signal processing section 19 calculates the distance and the relative velocity of the object reflecting the transmission wave based on the digital signals that are input, and calculates the direction of the object reflecting the transmission wave using the angle measurement method. The calculated direction, distance and relative velocity of the object are output from the signal processing section 19, and are supplied to an ECU (Electric Control Unit) 5 installed outside the on-vehicle radar device 1.

Various information including a vehicle velocity signal P1, steering angle information P2 and yaw rate signal P3 are supplied to the ECU 5 from each section of the vehicle 2.

Based on this information and the determined direction, distance and relative velocity, the ECU 5 warns the driver operating the vehicle via an alarm signal P5 or display signal P6. The ECU 5 can also perform a constant speed control by accelerating and releasing the accelerator via a throttle signal p4.

Now the signal processing in the signal processing section 19 will be described in detail with reference to FIG. 5 to FIG. 7. FIG. 5 is a flow chart depicting the processing of the signal processing section 19 according to an embodiment of the present invention. Digital signals are supplied to the signal processing section 19 by the A/D converters 18a to 18z. The supplied digital signals are Fourier-transformed by the signal processing section 19 (step S1).

In step S1, the signal processing section 19 calculates the distance dn up to the object which reflected the transmission wave and the relative velocity with the object based on the frequency information determined by a Fourier transform (step S2). The distance dn up to the object is calculated based on the time difference $\Delta T$ between the transmission wave and the receive wave as described in FIG. 4. The relative velocity with the object is calculated based on the frequency component of the Doppler shift DS received by the reflection wave.

It is possible to observe a plurality of objects by one observation, and discriminating objects having different distances will now be described.

Figure 6:
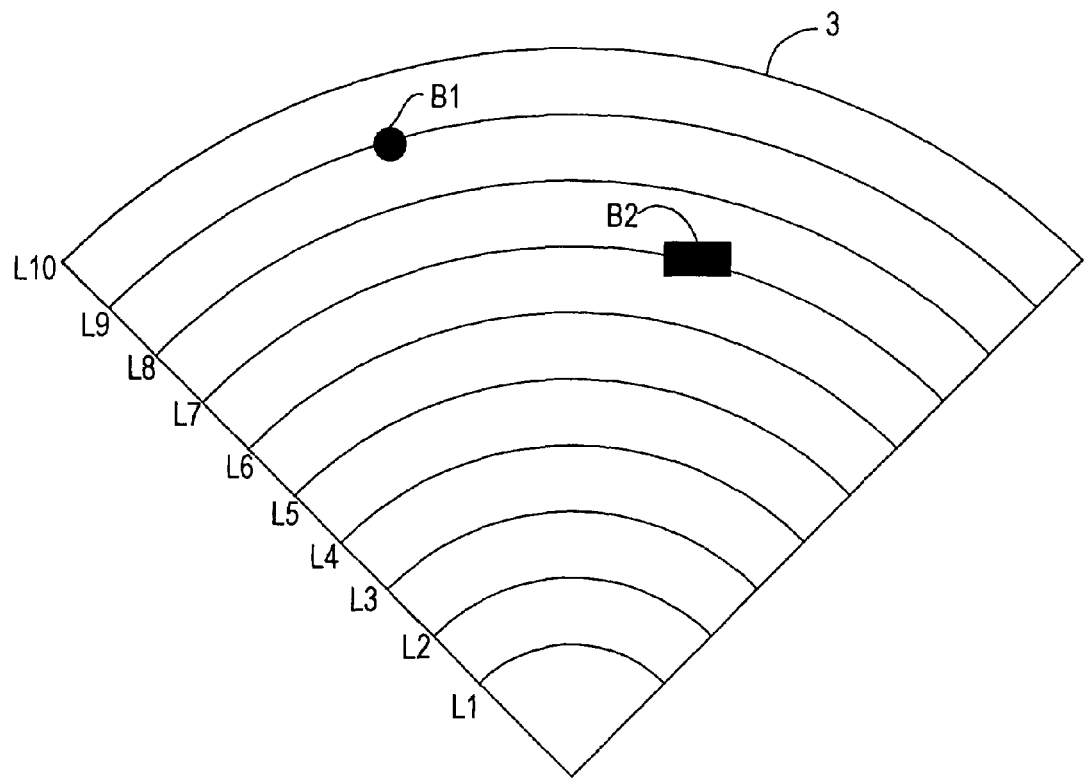
FIG. 6 is a diagram depicting the observation of objects at different distances in FIG. 5.

FIG. 6 is a diagram depicting the observation of objects having different distances. The transmission wave which is transmitted throughout the detection range 3 shown in FIG. 3 is reflected by objects B1 and B2. As FIG. 6 shows, the object B1 exists at a location with distance L9, and object B2 exists at a location with distance L7.

The signal processing section 19 distinguishes the reflection wave by object B1 and the reflection wave by object B2 by the difference of frequency of the reflection wave. In this way, objects existing at positions with different distances are discerned. Now the observation of objects in a same distance will be described.

Figure 5:
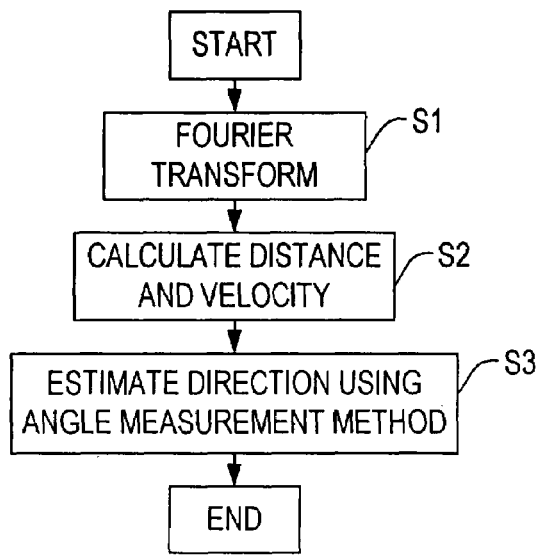
FIG. 5 is a flow chart depicting the processing of the signal processing section in FIG. 2.

Referring to FIG. 5, the direction of an object is estimated for a reflection wave coming from an object at a same distance as the determined distance dn, using an angle measurement method (step S3). The angle measurement method, for example, is a radio wave arrival direction estimation method, such as the Capon method or MUSIC (Multiple Signal Classification).

Figure 7:
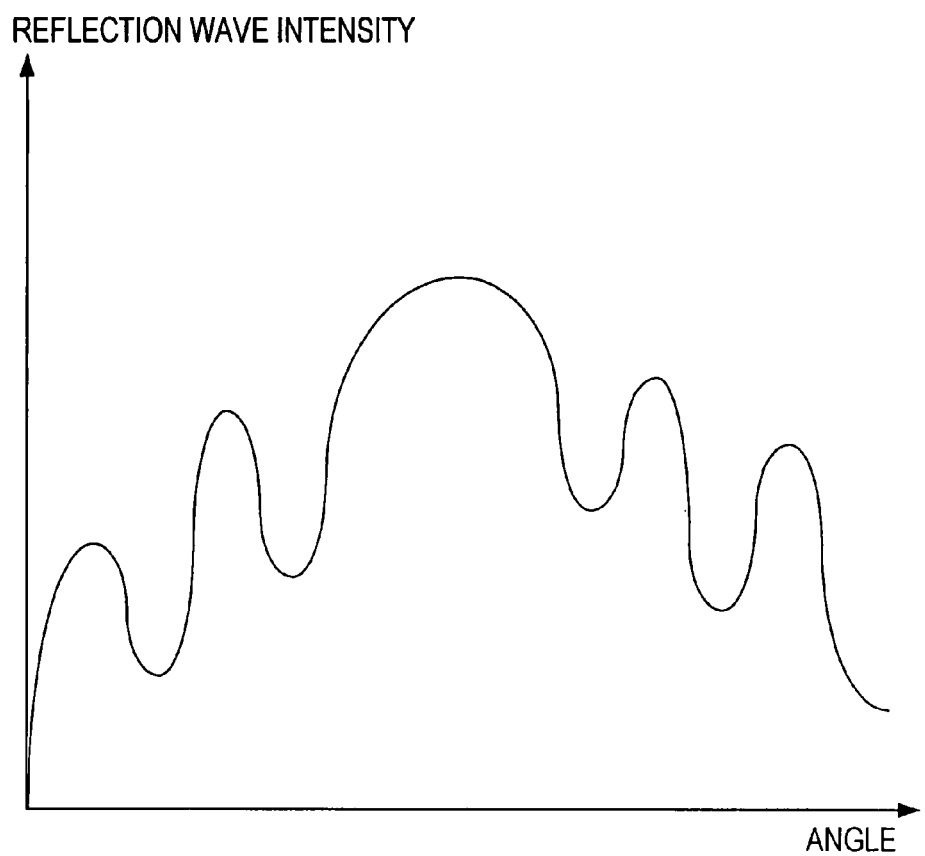
FIG. 7 is a diagram depicting the distribution of the reflection wave intensity depending on the angle acquired by the signal processing section in FIG. 6.

FIG. 7 shows an example of signal intensity distribution acquired by processing reflect signals at a specific distance by using the angle measurement method. In below, figures that the ordinate is the angle show the ordinate is the frequency shows signal intensity distribution acquired by angle measurement processing reflect signals at same distance.

FIG. 7 is a distribution of a reflection wave intensity acquired by the signal processing section 19 depending on the angle. The abscissa is an angle when the front direction of the vehicle 2 is a 0 radian, and the ordinate is an intensity of the reflection wave detected at this angle. Here it is judged that an object reflecting the transmission wave exists in a portion of the reflection wave intensity that exceeds the threshold.

Figure 8:
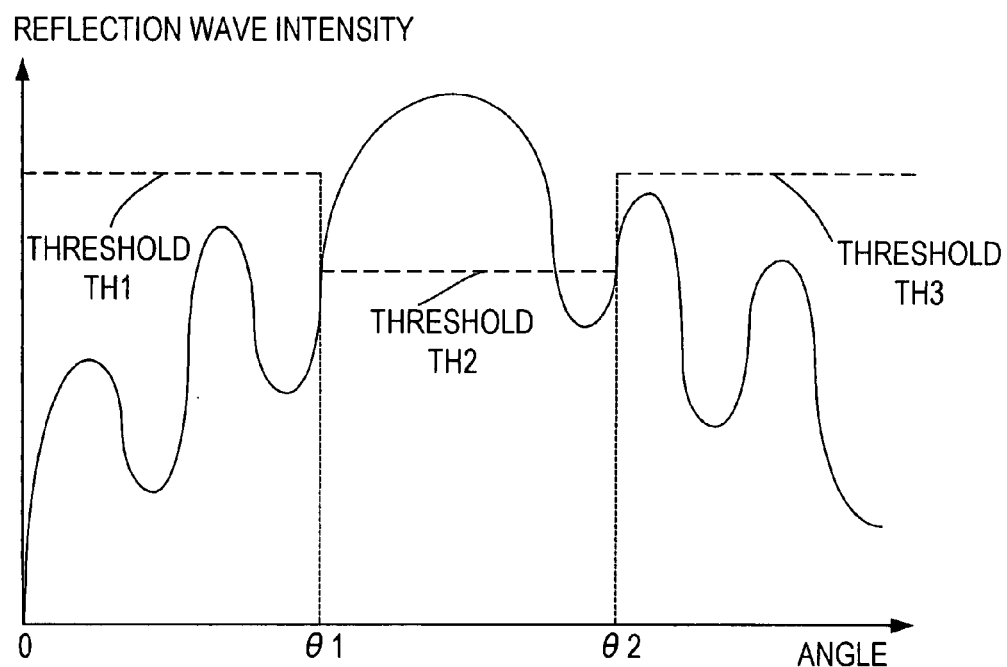
FIG. 8 is a diagram depicting the thresholds which are set during high-speed travel according to the first embodiment of the present invention.

FIG. 8 is a diagram depicting an example of setting the thresholds in a case shown in FIG. 7 according to the first embodiment of the present invention. As FIG. 8 shows, the detection area is divided into three, and a threshold is set for each area. In FIG. 8, the threshold TH2 is set for the center area of vehicle 2, and is applied to a detection of reflection waves which come from the directions at angle $\theta 1$ to $\theta 2$. Threshold TH1 is set for the left side of vehicle 2, and is applied to a detection of reflection waves which come from the directions at angle θ1 and left side thereof (angle θ1 or less). Threshold TH3 is set for the right side of vehicle 2, and is applied to reflection waves which come from the directions at angle θ2 and right side thereof (angle θ2 or more).

In this way, according to the on-vehicle radar device of the present invention, the detection range is divided into three or more, the threshold for the center area is set to low, and the thresholds for the left and right areas are set to high. Therefore detection of an object existing at the center area of the detection range 3 is easy, and a detection omission of a vehicle in front, which is supposed to be followed up, can be prevented. Also thresholds for the left and right areas are set to high, so miss-detection of an obstacle, such as a guard rail and on-coming vehicle, as a vehicle in front, which is supposed to be followed up, can be prevented.

This setting of thresholds is effective to follow up vehicles driving in front in an active cruise control system for automatically adjusting the distance between vehicles.

Second Embodiment of On-vehicle Radar Device

An example of setting a threshold according to the velocity of the vehicle mounting the radar device of the present invention will now be described as the second embodiment. In this case, there are three types of threshold setting modes. An on-vehicle radar device 1 according to this embodiment has a configuration the same as the on-vehicle radar device 1 according to the first embodiment. In the following description, FIG. 8 to FIG. 10 are used.

Figure 9:
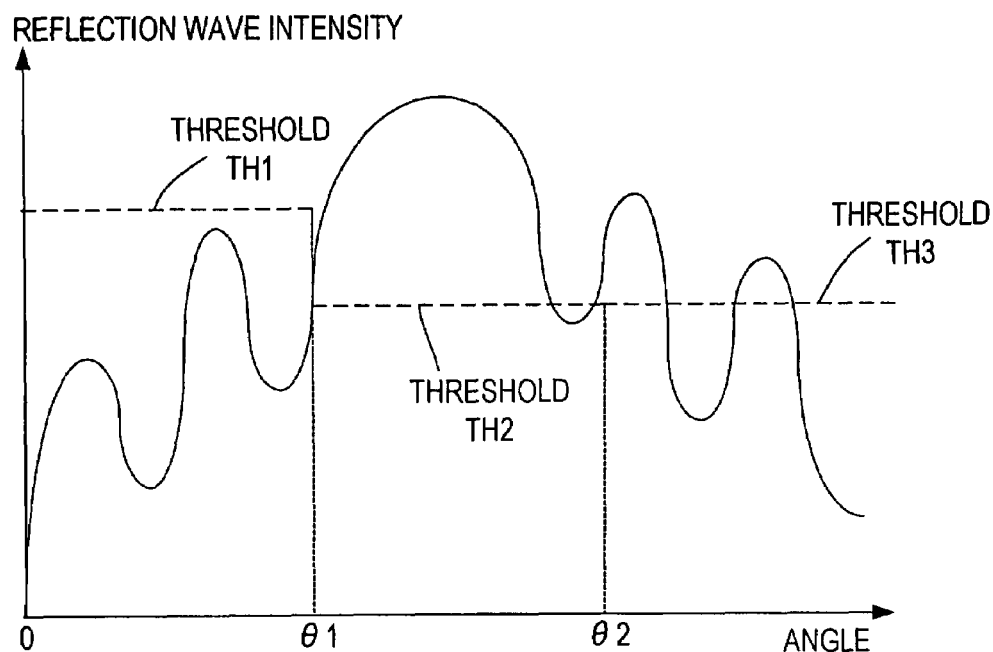
FIG. 9 is a diagram depicting the thresholds which are set during mid-speed travel according to the second embodiment of the present invention.
Figure 10:
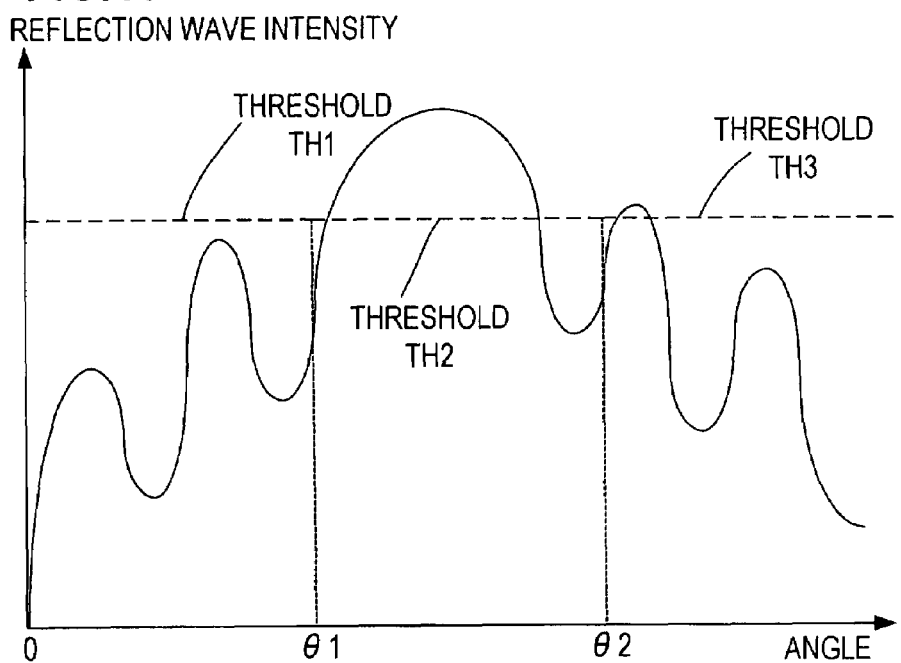
FIG. 10 is a diagram depicting the thresholds which are set during stopping or during slow speed travel according to the second embodiment of the present invention.

FIG. 8, FIG. 9 and FIG. 10 are examples for setting thresholds based on the traveling velocity. FIG. 8 was used for describing the first embodiment, but will also be used for describing the second embodiment since the way of setting thresholds is virtually the same.

In this example, a velocity signal P1 is input to the on-vehicle radar device 1 of the present invention via the ECU 5. A signal processing section 19 sets a threshold based on the velocity signal P1.

FIG. 8 is an example of thresholds which are set during high-speed travel. These thresholds are set when traveling at an 80 km or higher velocity is informed by the velocity signal P1. The threshold TH2 in FIG. 8 is set for the center area of the vehicle 2 and is applied to reflection waves which come from the directions at angle θ1 to θ2. Threshold TH1 is set for the left side of vehicle 2, and is applied to reflection waves which come from the directions at angle θ1 and left side thereof. Threshold TH3 is set for the right side of vehicle 2, and is applied to reflection waves which come from the directions at angle θ2 and right side thereof.

In the threshold settings in FIG. 8, the threshold TH2 at the center is lower than the values set for the two thresholds TH1 and TH3 at the left and right. In the case of the thresholds and distribution of the reflection wave intensity in FIG. 8, the on-vehicle radar device of the present embodiment detects one object at the center in the detection range. This setting is performed when a vehicle in front is accurately followed up in an active cruise control system for automatically adjusting the distance between vehicles.

During high-speed travel, the probability of contacting an obstacle is low if the vehicle is traveling by following up a vehicle in front. In other words, in this threshold setting, supplying information for the active cruise control system (e.g. object detection, position) is critical for the center and both left and right sides in the detection range.

FIG. 9 is an example of the thresholds which are set during mid-speed travel. These thresholds are set when traveling at 30 km/h or more and less than 80 km/h is informed by the velocity signal P1. In the threshold setting in FIG. 9, the threshold TH1 at the left side is higher than the two thresholds TH2 and TH3 at the center and the right in the detection range.

In the case of the thresholds and reflection wave intensity distribution in FIG. 9, FIG. 9 shows status that the on-vehicle radar device of the present embodiment detects total three objects, that is, one object at the center and two at the right side in the detection range. This setting is used when a vehicle traveling in front is accurately followed up and attention is paid to on-coming vehicles in an active cruise control system for automatically adjusting the distance between vehicles.

On a road for driving at the left, the probability to contact an obstacle at the left is low if the vehicle is traveling by following up a vehicle in front, and only on-coming vehicles must be paid attention to. In other words, in this threshold setting, supplying information to the active cruise control system is critical for both the center and left side in the detection range, and a pre-crash safe system is important only for the right side in the detection range.

FIG. 10 is an example of thresholds which are set during stopping or low speed travel. These thresholds are set when traveling at a velocity of less than 30 km/h is informed by the velocity signal P1.

In the threshold setting in FIG. 10, a same value is set for the three thresholds TH1, TH2 and TH3. This is for detecting obstacles that exist at the left and right and at the center in the detection range.

During stopping or traveling at a very low speed, the probability of traveling on a narrow road is high, and careful attention to obstacles is required. Simply following the vehicle in front is dangerous. In other words, in this setting, supplying information for a pre-crash safe system is critical for the center and for both the left and right sides in the detection range, and the active cruise control system is not used.

In this way, according to the on-vehicle radar device of the present embodiment, the detection range is divided into three or more areas, where the threshold for the center area is set low, and the thresholds for the edges are set high. By this, detection of an object existing in the center area of the detection range is easy, and a detection omission of a vehicle in front, which is supposed to be followed up, can be prevented. Also be setting a threshold according to the traveling velocity of the vehicle, a detection target object can be selected.

In the present embodiment, the on-vehicle radar device 1 has a traffic classification select switch for selecting driving at the left or driving at the right. For a country where traffic drives at the left, such as Japan and England, driving at the left is set, and for a country where traffic drives at the right, such as the United States of America and France, driving at the right is set.

In the above description, it was assumed that the traffic classification select switch of the on-vehicle radar device 1 is set to driving at the left. If the traffic classification select switch is set to driving at the right, the threshold of reflection wave intensity at the left and the threshold at the right in FIG. 8, FIG. 9 and FIG. 10 are reversed.

In the present embodiment, the area of distribution of reflection wave intensity depending on the angle is divided into three, and a threshold is set for each area, but this need not be divided into three.

Figure 11:
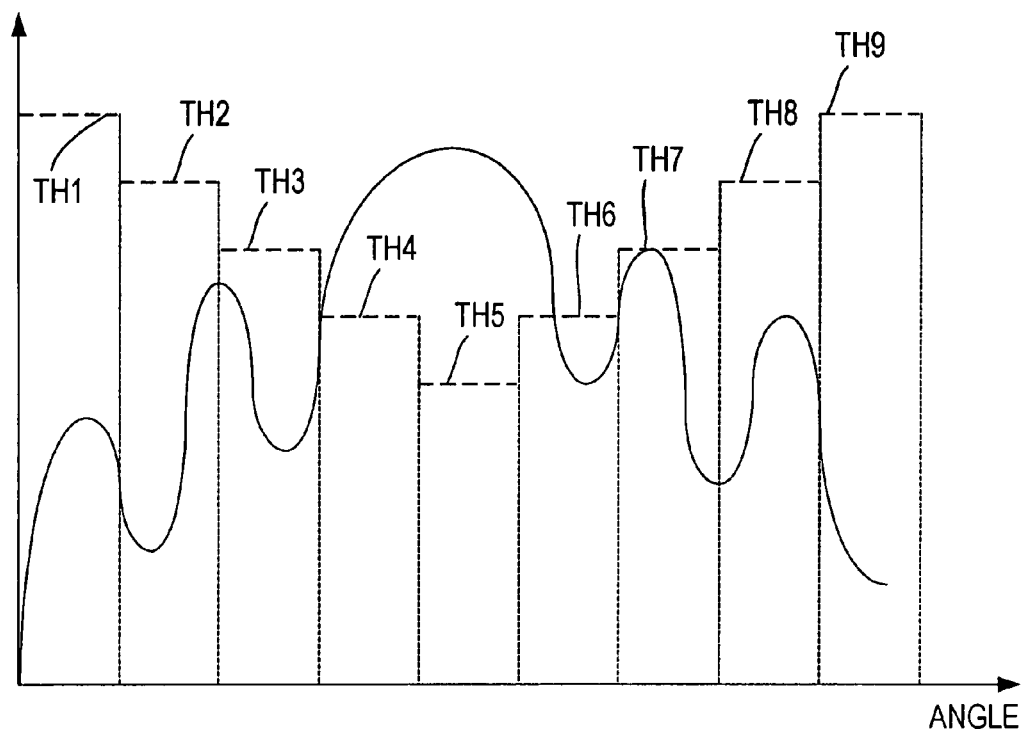
FIG. 11 is a diagram depicting the thresholds during high-speed travel which are set when the area of distribution of the reflection wave intensity depending on the angle is divided into 9 according to the second embodiment of the present invention.

FIG. 11 is a diagram depicting thresholds during high-speed travel which are set when the area of distribution of the reflection wave intensity depending on the angle is divided into nine. If the area of distribution of the reflection wave intensity depending on the angle is divided into three, the threshold setting during high-speed travel is as described in FIG. 8. This is further divided and thresholds TH1 to TH9 are set, whereby an error in detection of a vehicle in front which is supposed to be followed up and a detection omission of an obstacle can be prevented in more precise.

Third Embodiment of On-vehicle Radar Device

Figure 12:
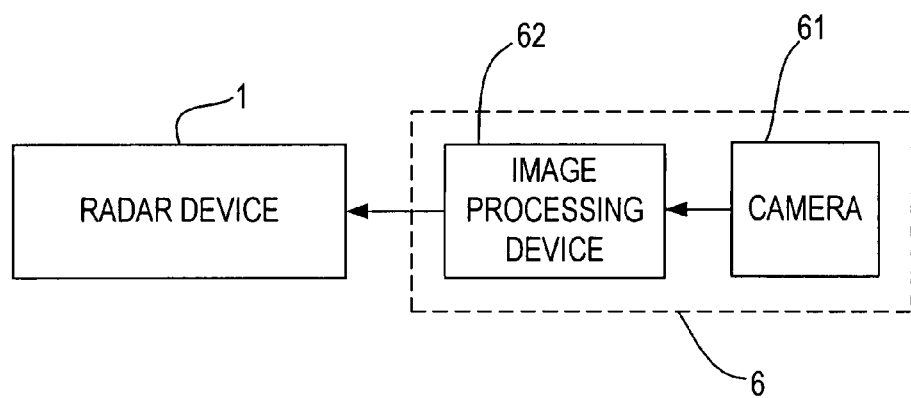
FIG. 12 is a block diagram depicting the connections of the on-vehicle radar device according to the third embodiment of the present invention.

FIG. 12 is a block diagram depicting an example of the connections of the on-vehicle radar device with another device according to the third embodiment of the present invention. The on-vehicle radar device 1 in FIG. 12 has a configuration the same as the on-vehicle radar device 1 according to the first embodiment. So a detailed description of the on-vehicle radar device 1 is omitted. To the on-vehicle radar device 1 of the present embodiment, a road shape recognition device 6 is connected.

The road shape recognition device 6 is comprised of a camera device 61 and an image processing device 62. In this case, the camera device 61 captures the image in front of the vehicle 2, and supplies it to the image processing device 62. This image is used for recognizing the white line on the road.

In other words, the image processing device 62 receives an image signal from the camera device 61, recognizes the white line on the road, and supplies the position of the white line to a signal processing section 19 of the on-vehicle radar device 1. The signal processing section 19 recognizes the curve of the road to the right when shifting the position of the white line to be supplied to the right, and recognizes the curve to the left when shifting the position of the whit line to the left.

Figure 13:
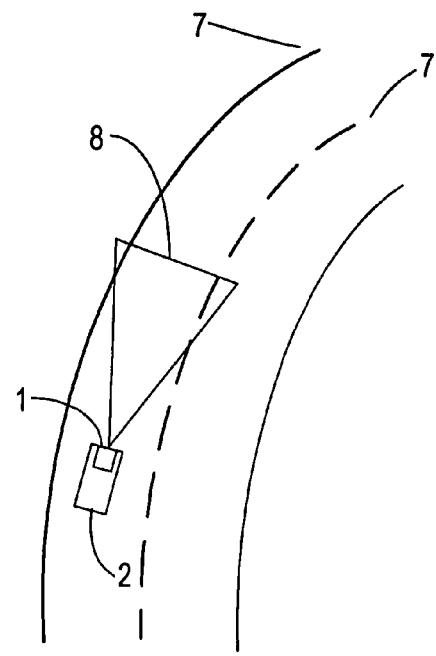
FIG. 13 is a diagram depicting the road shape recognition according to the embodiment in FIG. 12.

FIG. 13 is a diagram depicting the recognition of the road shape according to the present embodiment. The vehicle radar device 1 mounted on the vehicle 2 recognizes two white lines 7 in a visual field range 8 of the camera device 61. If the white lines 7 curve to the right, the on-vehicle radar device 1 recognizes the right curve, and if the white lines 7 curve to the left, the on-vehicle radar device 1 recognizes the left curve of the traveling road.

Figure 14:
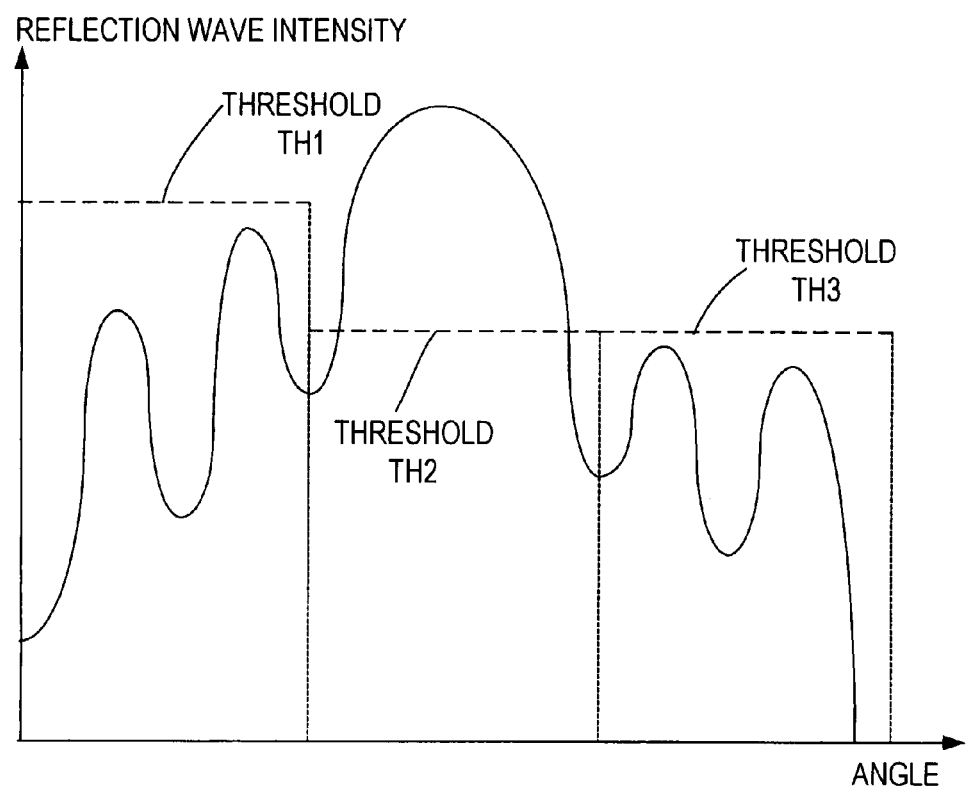
FIG. 14 is a diagram depicting the thresholds which are set when a right curve is detected according to the embodiment in FIG. 12.

FIG. 14 shows an example of the thresholds of the on-vehicle radar device which are set when a right curve is detected. In the threshold setting in FIG. 14, the value of the threshold TH1 for the left side in the detection range is set to be higher than the values to be set for the thresholds TH2 and TH3 for the center and right side in the detection range.

At a right curve, since an obstacle such as a guard rail is existed at a left side, this setting prevents an error in detection of the obstacle that the reflection wave intensity is increased as a vehicle in front which is supposed to be followed up. The reason why setting the threshold for the right side to be low is because attention must be paid to contact with an on-coming vehicle, and because the vehicle in front, which is supposed to be followed up, may move into the area at the right side.

Therefore in this threshold setting, the supply of information to the active cruise control system is critical for the center and left side in the detection range, and the threshold is set for both the active cruise control system and the pre-crash control system for the right side in the detection range.

Figure 15:
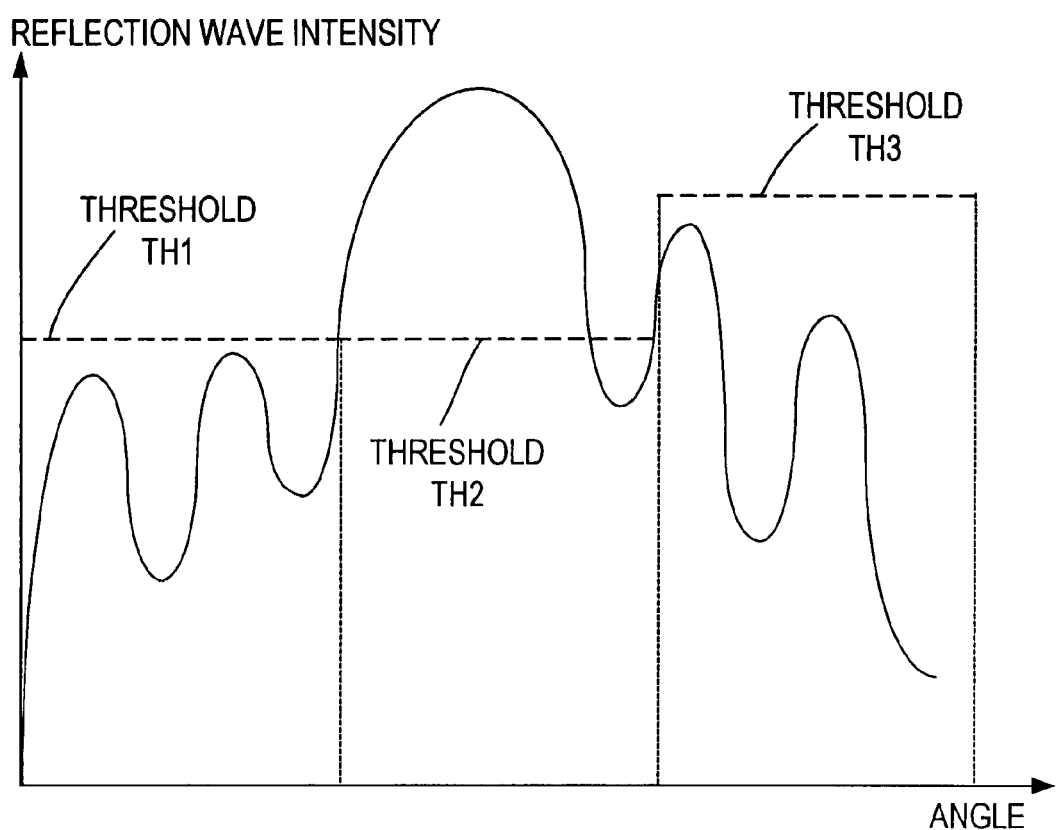
FIG. 15 is a diagram depicting the thresholds which are set when a left curve is detected according to the embodiment in FIG. 12.

FIG. 15 is a diagram depicting an example of thresholds which are set when a left curve is detected. In the threshold setting in FIG. 15, the value of the threshold TH3 for the right side is set to be higher than the values to be set for thresholds TH1 and TH2 for the center and left side in the detection range.

This is for preventing that an on-coming vehicle at the right side or a vehicle traveling next to it in a same direction is miss-detected as a vehicle in front, because increasing in the reflection wave intensity of such an obstacle as an on-coming vehicle at the right side or a vehicle traveling next to it in a same direction at a left curve. The reason why setting the threshold at the left to be low are because attention must be paid to contact with an obstacle by the road side, and because the vehicle in front, which is supposed to be followed up, may move to an area at the left side.

Therefore in this setting, the supply of information to the active cruise control system is critical for the center and right side in the detection range, and for the left side, the threshold is set for both the active cruise control and pre-crash control systems.

In this way, according to the on-vehicle radar device of the present embodiment, the detection range is divided into three or more areas, where the threshold for the center area is set low, and the thresholds for the edges are set high, so that detection of an object existing in the center area of the detection range is easy, and a detection omission of a vehicle in front, which is supposed to be followed up, can be prevented.

Also by setting a threshold according to the curve of a traveling road, an error in detection of a vehicle in front due to a miss-detection of a guard rail, an on-coming vehicle or a vehicle traveling next to it in a same direction, can be prevented.

In the present embodiment, an example of the connections of a road shape recognition device 6, comprised of a camera device 61 and image processing device 62, to an on-vehicle radar device 1, was described. But the road shape recognition device 6 may be a car navigation device which recognizes the position of the vehicle traveling by position recognition using GPS (Global Positioning System), and displays the position on a map.

The road shape recognition device 6 may be a steering rudder angle sensor for detecting an angle of the steering wheel. By detecting an angle of the steering wheel, the shape of the traveling road can be indirectly recognized. The road shape recognition device 6 may also be a yaw rate sensor for detecting the change of the direction of a vehicle. By detecting the change of direction of a vehicle, the shape of the traveling road can be indirectly recognized.

The road shape recognition device 6 may be a magnetic nail sensor for detecting the magnetism of a magnet embedded in a road. By detecting the magnetism of a magnetic embedded in a road, the shape of the traveling road can be directly recognized. By combining a plurality of the above road shape recognition devices, the accuracy of detected information on road shape can be increased.

Furthermore, the road shape recognition device 6a may be a mobile phone connected to a vehicle control device via USB (Universal Serial Bus) or a wireless device such as a ground digital terminal device. A recognition of the road shape is supported by acquiring a map information received via the mobile phone or information of a local ground digital broadcast.

Or the road shape recognition device may be a on-vehicle device which receives a service from an infra type road status providing unit such as DSRC (Dedicated Short Range Communication) and DSCC (Drivers Safety Support System).

Fourth Embodiment of On-vehicle Radar Device

Figure 16:
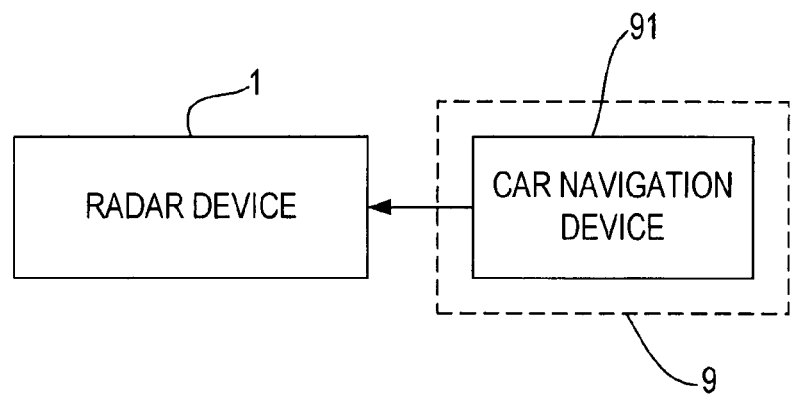
FIG. 16 is a diagram depicting the connections of the on-vehicle radar device according to the fourth embodiment of the present invention.

FIG. 16 is a block diagram depicting an example of the connections of the on-vehicle radar device according to the fourth embodiment of the present invention. An on-vehicle radar device 1 in FIG. 16 has a configuration the same as the on-vehicle radar device 1 according to the first embodiment. According to the on-vehicle radar device 1 of the present embodiment, a road type recognition device 9 for recognizing whether the traveling road is a highway or general road is connected. Specifically, the road type recognition device 9 is comprised of a car navigation device 91.

The car navigation device 91 recognizes the current position of a vehicle 2 by GPS, collates this information with stored map information, and judges whether the traveling road is a highway or general road. Information on whether the traveling road is a highway or general road is notified to the on-vehicle radar device 1.

Figure 17:
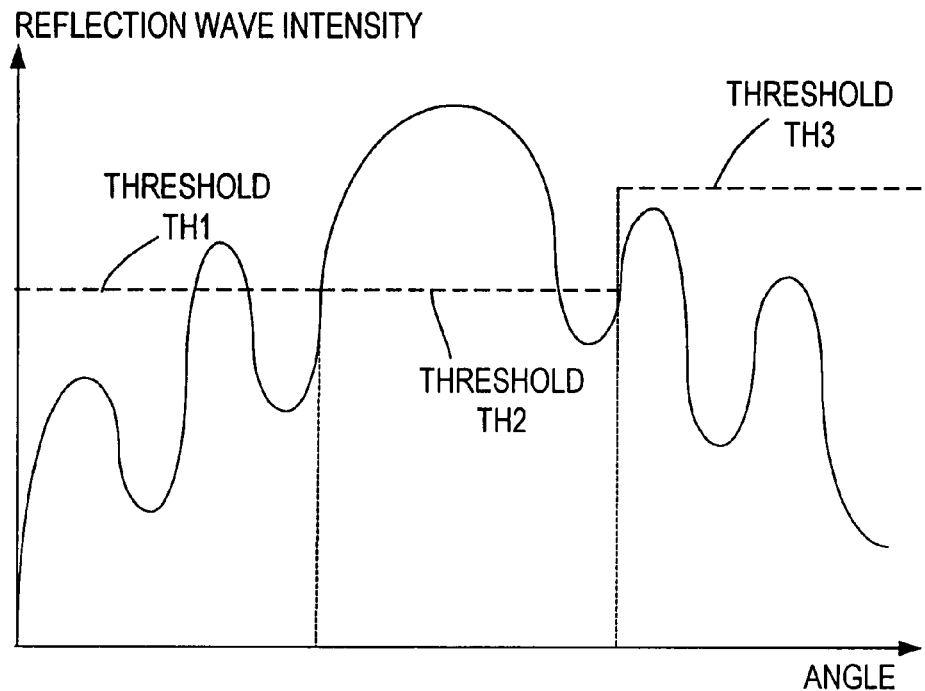
FIG. 17 is a diagram depicting the thresholds which are set during travel on a highway according to the embodiment in FIG. 16.

FIG. 17 is a diagram depicting an example of thresholds which are set during travel on a highway. In the threshold setting in FIG. 17, the value of threshold TH3 for the right side is set to be higher than the values to be set for thresholds TH1 and TH2 for the center and left side in the detection range.

Setting the threshold for the left side to be low is because there are less obstacles on a highway, such as a bill board on the left side of the road (when traveling on the left side), than on a general road, and this causes no problem for recognizing a vehicle in front. Setting the threshold for the right side to be high is because a highway is separated from the lane for on-coming traffic by a median strip, so there is no or less need to pay attention to on-coming vehicles.

Therefore in this setting, the supply of information to the active cruise control system is critical for the center and right side, and the supply of information to a pre-crash safe system is critical for the left side in the detection range.

Thresholds to be set during traveling on a general road are set according to the velocity and road shape, as described in the above embodiments.

In this way, according to the on-vehicle radar deice of the present embodiment, the detection range is divided into three or more areas, where the threshold for the center area is set low, and the threshold for the right side is set high, so that detection of an object existing in the center area of the detection range is easy, and a detection omission of a vehicle in front, which is supposed to be followed up, can be prevented. Also by setting a threshold depending on whether the traveling road is a general road or highway, a miss-detection of a vehicle in front can be prevented.

Fifth Embodiment of On-vehicle Radar Device

Examples of setting thresholds according to the traveling status, such as the velocity of the vehicle, shape of the road and difference between highway and general road, were described in the first to fourth embodiment. In the fifth embodiment, the setting of thresholds is changed based on the detection result.

Figure 18:
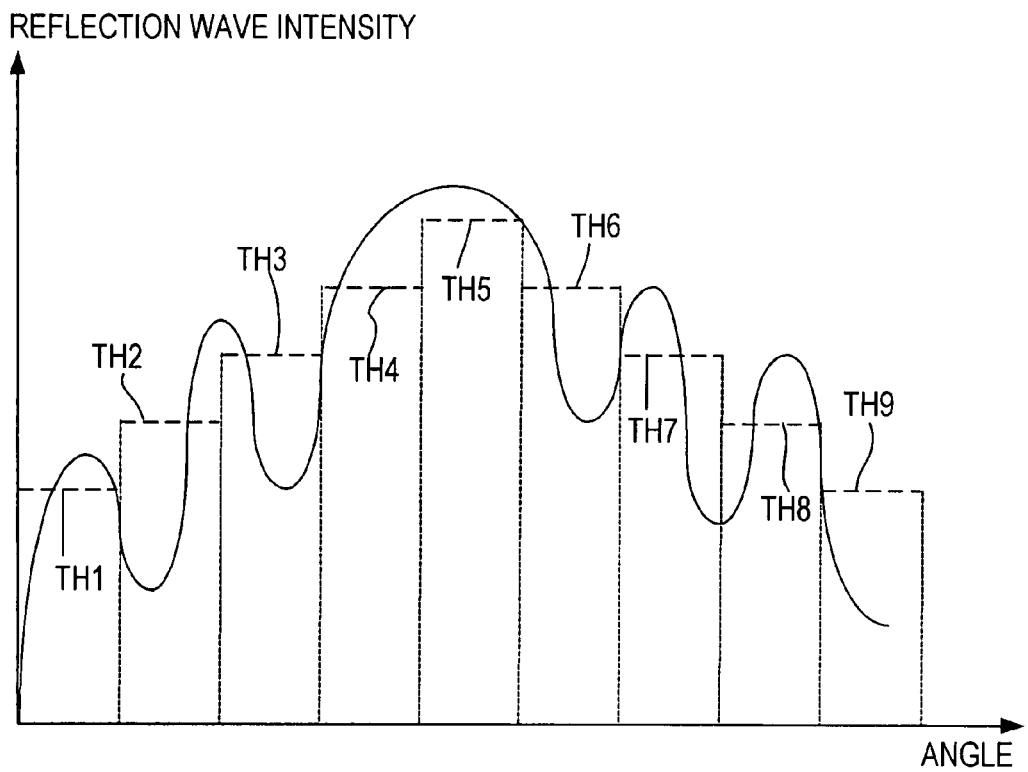
FIG. 18 is a diagram depicting an example of setting the thresholds according to the fifth embodiment of the present invention.
Figure 19:
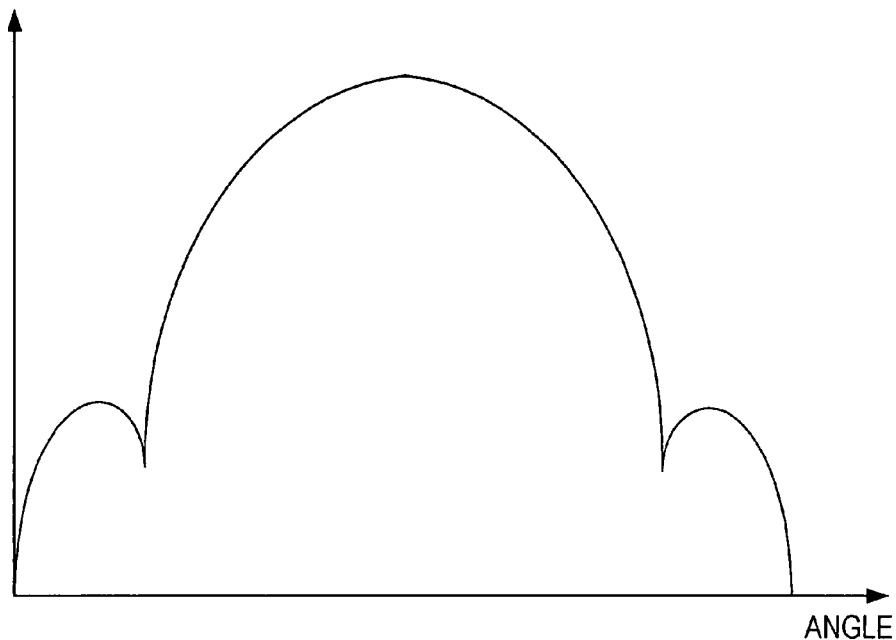
FIG. 19 is a diagram depicting the distribution of the radio wave intensity transmitted by the transmission antenna depending on an angle according to the embodiment in FIG. 18.

FIG. 18 is a diagram depicting an example of setting thresholds according to the fifth embodiment of the present invention. FIG. 19 is a distribution of the intensity of a radio wave, which is transmitted from a transmission antenna, depending on the angle. As FIG. 19 shows, the intensity of the radio wave transmitted from the transmission antenna 13 is high at the center area and low at both the left and right ends of the detection range. An on-vehicle radar device 1 has a configuration the same as the on-vehicle radar device 1 according to the first embodiment.

According to this distribution of the transmission wave intensity depending on the angle acquired by experiment, the thresholds shown in FIG. 18 are set. This setting is used when only obstacles are given attention, without using the active cruise control system. In other words, this setting corresponds to the threshold setting during low speed travel in the second embodiment.

In FIG. 18, thresholds TH1 to TH9 are set according to the distribution of the transmission wave intensity in FIG. 19. By setting thresholds in this way, obstacles at various angles can be detected with higher accuracy.

Figure 20:
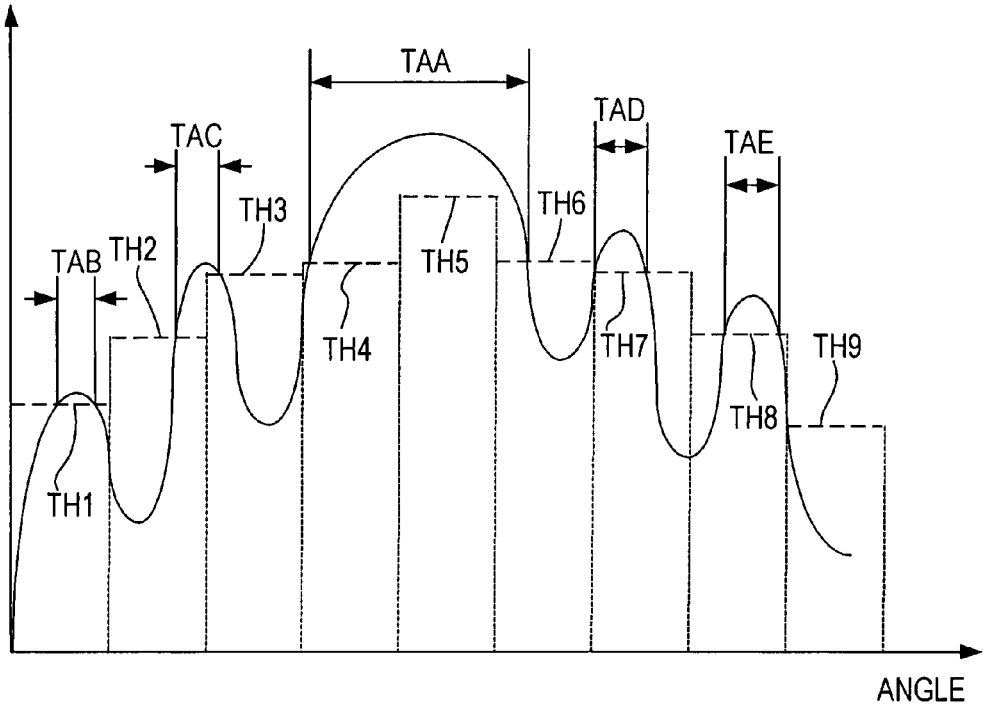
FIG. 20 is a diagram depicting an example of changing the thresholds based on the velocity of an observed object in an active cruise control system according to the embodiment in FIG. 18.

In the present embodiment, a new threshold is set for the area where an object is detected, as described in FIG. 20. In the area where an object is detected, a new threshold is set based on the velocity of the detected object. The velocity of the detected object is determined based on the relative velocity acquired in step S2 of the flow chart in FIG. 5.

In other words, in the case of an active cruise control system for detecting a vehicle traveling in front and automatically adjusting the distance between vehicles, the threshold of the reflection wave intensity at an angle where the object is detected is decreased if it is judged that the object is a traveling vehicle from the detected velocity. For example, if an object which is judged as a traveling vehicle is observed during a period from one second ago to now, the threshold being set is decreased 10%.

If it is judged that the object is stopping based on the velocity of the object in the active cruise control system, the threshold of the reflection wave intensity at the angle where the object is observed is increased. For example, if an object that can be judged as a stationary object is observed during a period from one second ago to now, the threshold being set is increased 10%.

FIG. 20 is a diagram depicting an example of changing the threshold according to the velocity of the observed object in the active cruise control system. If a reflection wave intensity shown in FIG. 11 is observed, the thresholds TH1 to TH9 are changed according to the velocity of the observed object for each area.

Now it is assumed to employ a judgment base of a detection of a object as 30 km/h, and to judge a stationary object if the velocity is less than 30 km/h, and to judge a vehicle in front if the velocity is equal or more than 30 km/h.

Now it is assumed that a vehicle traveling in front is detected in an angle range where the thresholds TH4 to TH6 are set in FIG. 11. It is assumed that objects detected in another range are stationary objects.

In this case, as FIG. 20 shows, the thresholds TH4 to TH6, in the area where the traveling vehicle is detected, are decreased 10% respectively, and the thresholds TH1 to TH3 and TH7 to TH8, in the area where a stationary object is detected, are increased 10% respectively. The threshold TH9 in the area where an object is not observed is unchanged.

By the changes of these thresholds, the peak TAA corresponding to a vehicle in front expands in the width so that objects can be easily observed. Peaks TAB, TAC, TAD and TAE corresponding to a stationary object decrease in width, therefore it can no longer be observed in some cases.

This method of changing the thresholds can also be applied to a system other than the active cruise control system.

For example, in the case of a pre-crash safe system which detects an object and activates the brake before a collision, if it is judged that an object is a vehicle traveling in front, the threshold of the reflection wave intensity at an angle where the object is observed is increased. For example, if an object that can be judged as a traveling vehicle is observed during a period from one second ago to now, the threshold being set is increased 10%.

If it is judged that the object is stopping based on the velocity of the object in the pre-crash safe system, the threshold of the reflection wave intensity at an angle where the object is observed, is decreased. For example, if an object that can be judged as a stationary object is observed during a period from one second ago to now, the threshold being set is decreased 10%.

FIG. 21 is a diagram depicting an example of changing thresholds according to the velocity of the observed object in a pre-crash safe system. When reflection wave intensity as shown in FIG. 11 is observed, the thresholds TH1 to TH9 are changed according to the velocity of the observed object.

Now it is assumed to employ a judgment base of a detection of a object as 30 km/h, and to judge a stationary object if the velocity is less than 30 km/h, and to judge a vehicle in front if the velocity is equal or more than 30 km/h.

Here, in FIG. 11, it is assumed that a vehicle traveling in front is detected in an angle range where the thresholds TH4 to TH6 are set. It is assumed that objects detected in the other range are stationary objects. The velocity for distinguishing a stationary object from a vehicle in front is 30 km/h, for example.

In this case, as FIG. 21 shows, the thresholds TH4 to TH6 are increased 10% respectively, and the thresholds TH1 to TH3 and TH7 to TH8 are decreased 10% respectively. The threshold TH9 in the area where an object is not observed is unchanged.

By these threshold changes, the peak TAA corresponding to a vehicle in front is divided the detected areas into two and reduced, and can no longer be observed in some cases. The peaks TAB, TAC, TAD and TAE corresponding to a stationary object expand the detected area in width so that observation becomes easy.

In this way, according to the on-vehicle radar device of the present embodiment, the detection range of objects is divided into a plurality of areas, and a threshold of the reflection wave intensity is set for each area, and according to the velocity of the object detected using threshold, the threshold is changed.

And it is judged whether the object is a stationary object or a traveling vehicle, and if focus should be placed on the pre-crash safe system, the threshold for the area where the stationary object is observed is decreased, and if focus should be placed on the active cruise control system, the threshold for the area where the traveling vehicle is observed is decreased. By this, a detection error of the vehicle in front, that is supposed to be followed up, or a detection omission of an obstacle, are prevented.

In the present description, the on-vehicle radar device having a phased array antenna was used for explanation, but the antenna to be used for the present invention may be a monopulse antenna, or a digital beam forming antenna.

What is claimed is:

1. An on-vehicle radar device for being mounted on a vehicle, comprising:
   a transmission section for transmitting a radio wave to an object;
   a receive section for receiving said radio wave reflected by said object; and
   a processing section for dividing a range, where an object is detected by receiving said radio wave, into three or more of a plurality of areas, setting a threshold of an intensity of said radio wave received for each of said plurality of areas, and judging existence of an object by comparing the intensity of said radio wave and said threshold for each areas, wherein
   said processing section sets a second threshold of a second angle area in said detection range to be lower than a first and a third threshold of a first angle area and a third angle area, when a traveling velocity supplied from a velocity detection device for detecting the velocity of said vehicle is a predetermined velocity or more in a status where said vehicle is automatically adjusting the velocity according to the traveling velocity of a vehicle in front.

2. An on-vehicle radar device for being mounted on a vehicle, comprising:
   a transmission section for transmitting a radio wave to an object;
   a receive section for receiving said radio wave reflected by said object; and
   a processing section for dividing a range where an object is detected by receiving said radio wave into three or more of a plurality of areas, setting a threshold of an intensity of said radio wave received for each of said plurality of areas, and judging existence of an object by comparing the intensity of said radio and said threshold for each area, wherein
   said processing section sets a threshold of one area out of a first angle area and a third angle area in the detection area of the object to be higher than a threshold of another area out of the first angle area and the third angle area according to information on road shape supplied from a road shape recognition device for recognizing a shape of a road on which the vehicle is traveling in a status where said vehicle detects an object in advance and avoids the object.

3. An on-vehicle radar device for being mounted on a vehicle, comprising:
   a transmission section for transmitting a radio wave to an object;
   a receive section for receiving said radio wave reflected by said object; and
   a processing section for dividing a range where an object is detected by receiving said radio wave into three or more of a plurality of areas, setting a threshold of an intensity of said radio wave received for each of said plurality of areas, and judging existence of an object by comparing the intensity of said radio wave and said threshold for each area, wherein
   said processing section decreases the threshold of an area where said object existing in said area is moving in a status where said vehicle is automatically adjusting the velocity according to the traveling velocity of a vehicle in front.

4. An on-vehicle radar device for being mounted on a vehicle, comprising:
   a transmission section for transmitting a radio wave to an object;
   a receive section for receiving said radio wave reflected by said object; and
   a processing section for dividing a range where an object is detected by receiving said radio wave into three or more of a plurality of areas, setting a threshold of an intensity of said radio wave received for each of said plurality of areas, and judging existence of an object by comparing the intensity of said radio wave and said threshold for each area, wherein
   said processing section decreases the threshold of an area where an object existing in said area is stationary in a status where said vehicle detects an obstacle in advance and avoids the obstacle.

* * * * *